April 21, 1959
R. P. LATHROP
2,883,617
RECORDER FOR ELECTRICAL RESISTANCE TYPE
CONDITION RESPONSIVE MEANS
Filed Oct. 16, 1953
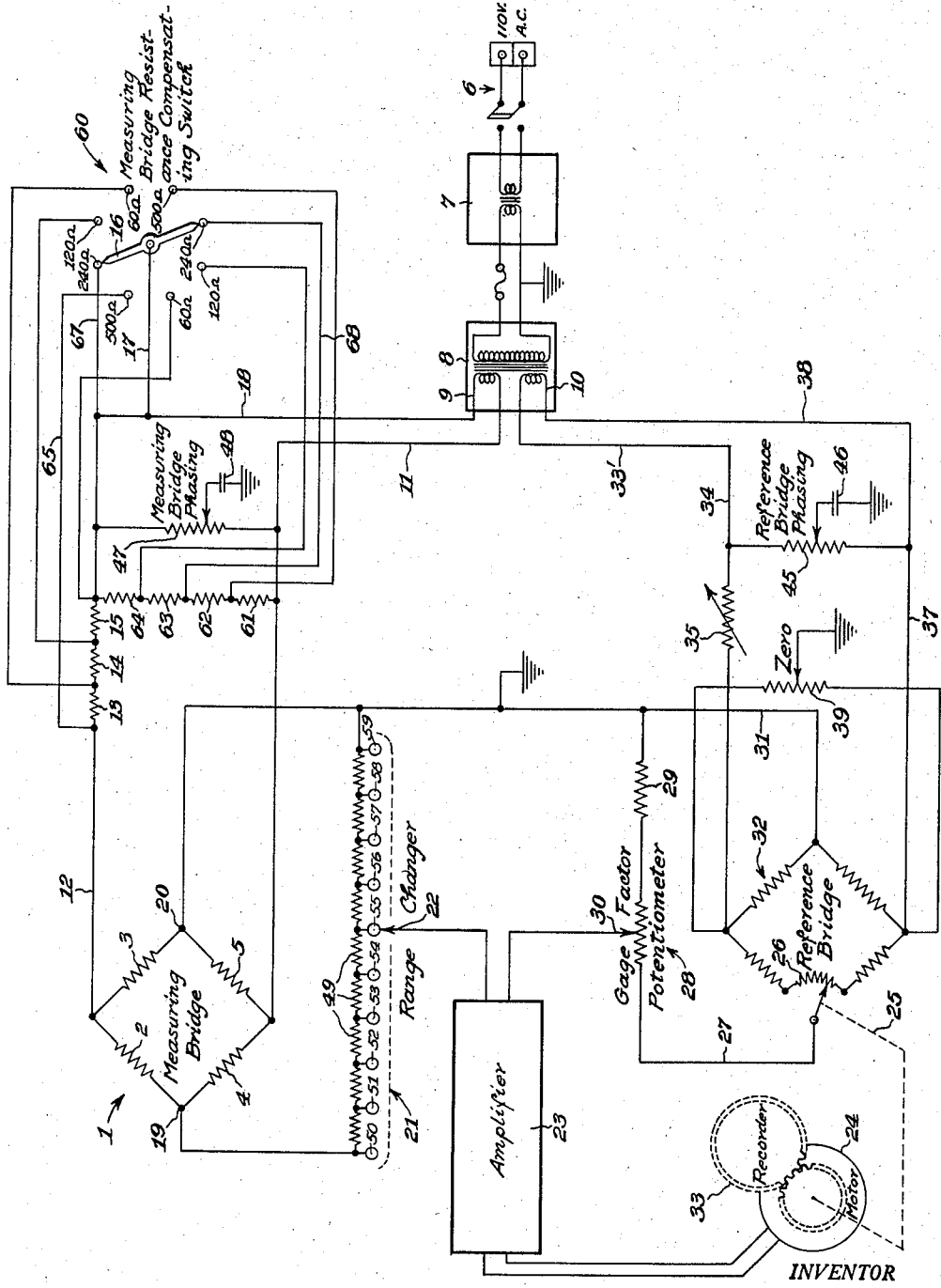
INVENTOR
ROBERT P. LATHROP
BY
ATTORNEY

United States Patent Office 2,883,617
Patented Apr. 21, 1959

2,883,617

RECORDER FOR ELECTRICAL RESISTANCE TYPE CONDITION RESPONSIVE MEANS

Robert P. Lathrop, Chevy Chase, Md., assignor to Baldwin-Lima-Hamilton Corporation, a corporation of Pennsylvania Application October 16, 1953, Serial No. 386,644

2 Claims. (Cl. 324—62)

This invention relates generally to recorders for resistance type transducers for measuring force, fluid pressure, torque, strain, temperature, and others well known in the art.

In the use of such transducers with recorders it is desirable to change the sensitivity of response of the recorder so that different scale ranges, or spans, are available on the recorder for a given resistance change in the transducers, but heretofore range changes have been limited by the complications and difficulties encountered.

One object of my invention is to provide an improved circuit whereby many range changes for the recorder may be effected in a relatively simple and effective manner.

It is also an object to provide an improved recording circuit that permits use of a wide range of nominal resistances in the transducers. A further object is to accomplish this improved result by a novel combination which compensates for differences in resistance of the transducers.

A still further object is to provide improved means in my circuit for compensating for gage factor when transducers of the bonded wire strain gage type are used, it being understood that bonded wire strain gages of various types may have different strain gage factors.

Another object is to provide an improved measuring circuit for recorders for resistive type transducers in which the components are so constructed and combined that their values can be effectively predetermined thereby greatly simplifying the manufacturing operation and cost in distinction to prior arrangements with require costly trimming of resistors and experimental calibration of the assembled equipment.

Other objects and advantages will be more apparent to those skilled in the art from the following description of the accompanying drawing which is a schematic wiring diagram of my improved circuit.

In the particular embodiment of my invention I have indicated a transducer as consisting of a measuring bridge 1 having four resistances 2, 3, 4 and 5 at least one of which represents a condition responsive resistance element such as, for example, a strain gage, or a resistance thermometer element, etc. One, two, three, or all four of these elements may be made condition responsive, the remaining of the four required to complete the bridge being elements of fixed resistance. To record changes in the resistance resulting from variations in the condition to be measured, the condition responsive bridge 1 is supplied with A.C. electrical power from a suitable source 6 which is passed through a usual isolation transformer 7 and thence through a bridge transformer 8 which has two secondaries 9 and 10. The secondary 9 supplies power through line 11 to one side of the bridge and thence through wire 12 and resistances 13, 14, 15 to switch arm 16 and wires 17 and 18 to the other side of the transformer secondary 9.

Assuming that a change occurs in the condition so that the resistance elements of bridge 1 become unbalanced, a change in voltage between points 19 and 20 develops. This is applied to a range changer potentiometer generally indicated at 21 and thence through a tap 22 to the amplifier 23 whose output drives a reversible slide wire motor 24 which, as diagrammatically shown, mechanically drives a shaft 25 and a movable contact arm, connected thereto, of a slide wire 26. This slide wire is a part of a reference bridge to which a fixed voltage is applied in a manner to be explained later. The drive motor 24 responds in opposite directions depending on whether the voltage appearing at tap 22 is greater or less with respect to ground than that appearing at tap 30. As the position of the movable arm of the slide wire 26 is adjusted by the motor 24 a counter voltage change appears in the wire 27 and is fed through a gage factor potentiometer 28 and a fixed resistance 29. The tap of the gage factor potentiometer 28 applies a portion of this changing voltage to the amplifier 23 until the voltage appearing at the tap 30 is equal to that which appears at tap 22, at which time the amplifier 23 ceases to power the drive motor 24. As will be seen later, the potentiometer 28 and resistance 29 comprise a shunt through wire 31 around the reference bridge 32. It will, of course, be understood that as long as the resistance of the transducer bridge 1 is undergoing change by variations in the condition being measured the slide wire motor 24 continues to follow such changes thereby to drive a recorder drum 33 diagrammatically indicated as being geared to slide wire motor 24. The details of the recorder drum and its usual stylus are well known in the art and hence need not be described further. It will also be understood that the recorder may be an indicating hand or other equivalent device all of which is broadly referred to herein as a recorder. The reference bridge 32 is supplied with power from the secondary 10 of transformer 8 through wires 33', 34 and a range or scale adjusting resistance 35 and thence through the bridge and back through wires 37 and 38 to the other side of the secondary. The reference bridge 32 is provided with a zero balancing potentiometer 39 whose function is to adjust the initial voltage appearing in wire 27 so that it is equal in its effect at tap 30 to the voltage appearing at tap 22 when the circuit is in electrical balance, such as is the case when the slide wire tap is in its desired starting position.

The reference bridge 32 is provided with a phasing potentiometer 45 which is connected across the leads 33' and 37. The center tap of the phasing potentiometer connects through capacitor 46 to ground for the purpose of adjusting the phase angle of the exciting voltage for bridge 32 to its optimum value as described below. Similarly, the measuring bridge 1 is supplied with a potentiometer 47 whose center tap is connected to ground through capacitor 48, the function of potentiometer 47 and capacitor 48 being to adjust the phase angle of the exciting voltage for the measuring bridge 1 to its optimum value as described below. The importance of this arrangement for capacity balancing the two bridges will be more apparent from the description of the range changer 21 and the considerations which follow.

For purposes of changing the scale or range of the recorder, the range changing potentiometer 21 is provided. This consists of a series of resistors 49 with taps 50-58, the values of the individual resistances being linearly related to the recorder scale. By this method a great many recorder scales are easily provided. For instance, for the lowest range scale, where the recorder will have maximum response for a given change of resistance in the measuring bridge 1, the tap 22 would be connected to tap 50. Any number of greater recorder scales can be provided as shown by taps 51-58. It will be seen that when tap 22 is at tap 50 it is required that the reference bridge circuit develop the same voltage as the measuring bridge. However, if the tap 22 is connected to tap 55 the reference bridge need develop only a portion of the voltage developed by the measuring bridge. For instance, when the tap 22 is at tap 50 the measuring bridge produces its maximum voltage to amplifier 23 thus requiring the slide wire motor 24 to move an appreciable distance to cause adjustment of slide wire 26 so that the reference bridge 32 can produce an equally high voltage to bring the system into null balance. Similarly, when the tap 22 is at the highest range tap 58 the voltage from measuring bridge 1 to the amplifier 23 is at a much lower value thereby requiring a relatively small amount of movement of slide wire motor 24 to adjust slide wire 26 so that the reference bridge voltage will be equal to the voltage of the measuring bridge for the setting at tap 58. Similarly, the various other taps 51–57 will call for a proportionate adjustment of the slide wire 26 by motor 24.

The reason for the effectiveness of this improved method of phasing adjustment will become more apparent from the following considerations. The amplifier 20 and reversible two phase drive motor 24 normally used with this type of measuring circuit rely, for proper operation, upon correct phase relation between the voltage supplied through the amplifier which is applied to one winding of the motor, and the line voltage which is applied to the other winding. The phasing arrangement 45 and 46 permits adjusting the phasing of the reference bridge with respect to line phase so as to supply a signal through the amplifier to the drive motor which is in correct phase relation with line voltage. The arrangement of 47 and 48 performs a similar function for the measuring bridge. Thus both the measuring bridge and the reference bridge are each phased for optimum response of the motor and amplifier as opposed to the usual method of using phase balancing on only one of the bridges. In the latter case the signals from each bridge contain large voltage components which are out of phase with the voltage required to operate the motor through the amplifier. With this latter arrangement, for a single position of the tap 22 on the taps 50–58 it is, in practice, possible to secure a phase relation between the two bridges such that the resultant voltage fed to the amplifier is correcly phased. However, repositioning tap 22 to some other tap in the series 50–58 usually destroys the correct phase relation of the bridge and output voltages and necessitates readjusting of the phasing arrangement. In the case of the dual phasing arrangement 45, 46, 47, 48, repositioning of tap 22 to any tap 50–58 can be accomplished without further phasing adjustment after proper initial setting has been obtained.

An auxiliary tap 59 is provided for short circuiting the measuring bridge 1 to enable adjustment of the phase relation of the reference bridge 32 for its optimum value which occurs when the voltage from the amplifier is at a minimum at which time the constant arm of the slide wire 26 will have come to a standstill.

It is desirable that this type of recorder be capable of use with transducers of various standard resistances and that the calibration of the recorder be not adversely affected by this change in resistance when such standard resistance transducers are substituted one for the other. This is accomplished by a switch 60 in combination with the resistors 13, 14, 15 and 61, 62, 63, 64. The function of these resistors being to preserve a constant current load on the bridge transformer secondary 9 and to compensate for the varying effect of shunt 21 on measuring bridges of different resistances. This is done by connecting switch 60 to any one of shunt resistances 61–64 according to the resistance of the measuring bridge in use so that the sum of the current drawn by the measuring bridge and by the shunt resistors is always the same. The series resistors 13, 14, 15 are similarly controlled by switch 60 so that the proper voltage is applied to the measuring bridge to compensate for the varying effect of the fixed shunt 21 on the measuring bridge as a result of the use of transducers having different resistance values in the measuring bridge.

For instance, when switch arm 16 is at the 500 ohms tap all of the resistances 13, 14 and 15 are shorted out by wire 65, and a resistance 61 is connected across the secondary transformer coil 9 by reason of wire 17. When switch arm 16 is at the next contact representing a 240 ohm measuring bridge 1 the entire series of resistances 13, 14, 15 are connected into the circuit by wire 67, and resistances 61 and 62 are connected across the secondary transformer coil 9 by wire 68. The taps for 120 and 60 ohms respectively cut out resistances 15 and 14, and simultaneously resistances 63 and 64 are introduced.

From the foregoing discloseure it is seen that I have provided a simple circuit for recording from resistive type measuring elements whereby it is possible to effectively obtain range changing, gage factor compensation and the use of measuring bridges of different resistance elements. The indication scale range or span response is unchanged even though the type of resistance elements in the measuring bridge is changed. This is done entirely through use of resistors of predetermined computable values, eliminating cut-and-try or adjustment-at-assembly steps with the exception of the very simple setting of the two phasing and one scale adjusting potentiometers. The range changer voltage taps are linearly related to range or scale and the gage factor compensator 28, 30 is also linearly related to gage factor. The series and shunt resistors respectively specifically shown as three and four in number at 13, 14 and 15, and 61–64 may be larger or smaller in number depending upon the number of measuring bridges of different resistances with which the recorder is to be used. These series and shunt resistors in the measuring bridge excitation are of such chosen values as to keep a constant current load on the transformer secondary 9 and thus a constant output voltage ratio with the reference bridge transformer secondary 10, regardless of the resistance of the type of resistance elements used in the measuring bridge or of the load losses in the transformer. In addition, these series and shunt resistors adjust the voltage applied to the measuring bridge 1 to compensate for the different shunting effects of the range changer shunt 21 on measuring bridges of different resistances.

Thus it is seen that not only the values of all resistors can be computed in a simple manner in advance to eliminate cut-and-try methods but also the calibration is simple since adjusting the scale on one range for one gage resistance in the measuring bridge automatically adjusts it for all ranges and all gage resistances. Also, the gage factor compensator 28 is a linear potentiometer with a linear scale which makes for great simplicity of manufacture. It is also apparent from my disclosure that the slide wire motor 24 may actuate any other suitable or desired motion responsive element instead of rotating the recorder drum 33.

It will, of course, be understood that various changes in details of construction and arrangement of parts may be made by those skilled in the art without departing from the spirit of the invention as set forth in the appended claims.

I claim:

1. A resistance type measuring circuit comprising, in combination, a resistance measuring bridge, a resistance reference bridge, means for supplying A.C. excitation voltage to the input side of said bridges, means responsive to the phase of the difference in voltage output of said bridges, means controlled by the phase responsive means for balancing the voltage output of the bridges against each other to effect a null balance operation of the phase responsive means, a range changer shunt across the output of the measuring circuit having a plurality of predetermined tap positions to effect multiple measuring ranges of the measuring bridge circuit, means for adjusting the capacity balance to ground of the measuring bridge and thereby effecting phase adjustment of the measuring bridge excitation voltage with respect to optimum phase adjustment for effecting response of said phase responsive means, and means for adjusting the capacity balance to ground of the reference bridge and thereby effecting phase adjustment in the reference bridge excitation voltage also with respect to optimum phase adjustment for effecting response of said phase responsive means so that the output voltage of each bridge is in optimum phase relation with respect to the phase responsive means, whereby any one of the tap positions of the range changer shunt may be used while maintaining a common setting of both of the phase adjusting means.

2. A resistance type measuring circuit comprising, in combination, a resistance measuring bridge, a resistance reference bridge, means for supplying power to the input side of said bridges, means for balancing the output of the bridges against each other to effect a null balance operation, means for maintaining a constant current output of the transformer for the measuring bridge for any value of resistance thereof thereby to maintain a constant ratio of the voltages supplied for the measuring and reference bridge circuits, said means including a resistor connected across the input sides of the measuring bridge and provided with a plurality of taps and switching means selectively connectable to said taps so that a predetermined value of shunting resistance is effected in accordance with the resistance of the measuring bridge whereby the sum of the currents supplied to the measuring bridge and to the shunting resistors is always constant.

References Cited in the file of this patent
UNITED STATES PATENTS

| | | |
|---|---|---|
| 1,379,266 | Keeler | May 24, 1921 |
| 1,596,942 | Nyquist et al. | Aug. 24, 1926 |
| 2,173,233 | Lieneweg et al. | Sept. 19, 1939 |
| 2,254,400 | Starr | Sept. 2, 1941 |
| 2,309,490 | Young | Jan. 26, 1943 |
| 2,429,968 | Stanphill | Oct. 28, 1947 |
| 2,649,571 | Smith | Aug. 18, 1953 |
| 2,767,974 | Ballard | Oct. 23, 1956 |

FOREIGN PATENTS

| | | |
|---|---|---|
| 721,365 | Germany | June 5, 1942 |